United States Patent [19]

Taylor et al.

[11] Patent Number: 4,799,124

[45] Date of Patent: Jan. 17, 1989

[54] SHOCK HAZARD PROTECTOR FOR HAIR DRYERS

[75] Inventors: David C. Taylor, Patterson, N.Y.; William E. Springer, Fairfield, Conn.; Loretta Goeller, Rowayton, Conn.; Daniel Santhouse, Stratford, Conn.

[73] Assignee: Clairol Incorporated, New York, N.Y.

[21] Appl. No.: 793,598

[22] Filed: Oct. 31, 1985

[51] Int. Cl.$^4$ ............................................. H02H 5/04
[52] U.S. Cl. ........................................ 361/42; 361/104
[58] Field of Search .................. 361/42, 88, 43–50, 361/104, 178; 337/238, 239

[56] References Cited

U.S. PATENT DOCUMENTS

| | | | |
|---|---|---|---|
| 2,326,031 | 8/1943 | Hodnette et al. | 361/104 X |
| 3,450,949 | 6/1969 | Inglis | 361/104 |
| 4,081,851 | 3/1978 | Stevenson et al. | 361/42 |
| 4,096,464 | 6/1978 | Dennis et al. | 361/104 X |
| 4,124,835 | 11/1978 | Cahill, Jr. | 361/104 X |
| 4,270,158 | 5/1981 | Gilardoni et al. | 361/42 |
| 4,447,846 | 5/1984 | McCleery | 361/104 X |
| 4,464,582 | 8/1984 | Aragaki et al. | 361/42 X |
| 4,589,047 | 5/1986 | Gaüs et al. | 361/42 |
| 4,687,906 | 8/1987 | Fujishima et al. | 361/42 X |

*Primary Examiner*—A. D. Pellinen
*Assistant Examiner*—A. Jonathan Wysocki
*Attorney, Agent, or Firm*—Gene Warzecha

[57] ABSTRACT

A shock hazard protector for protecting small appliances from the presence of water. The shock hazard protector utilizes a fusible wire link mechanically connecting two opposing resilient electrical contacts. A triac is connected to a sensor circuit and, upon the occurrence of water in predetermined parts of the appliance, the triac fires and causes a current to be passed through the fusible link to melt the link, release the resilient electrical contacts and open both power line simultaneously.

4 Claims, 1 Drawing Sheet

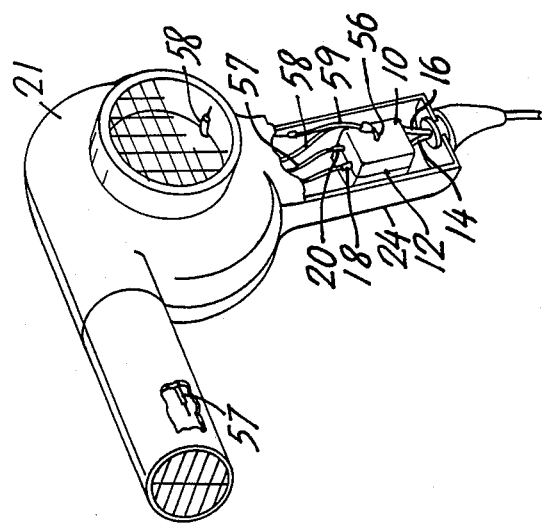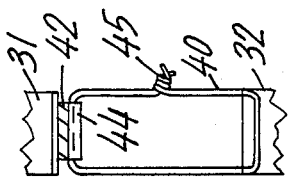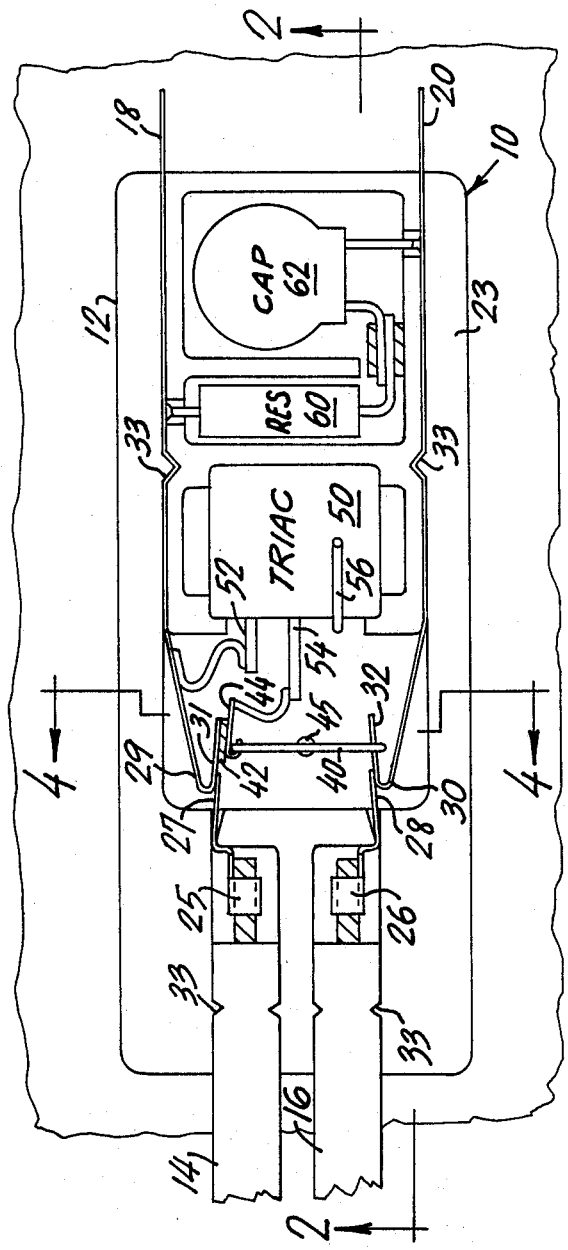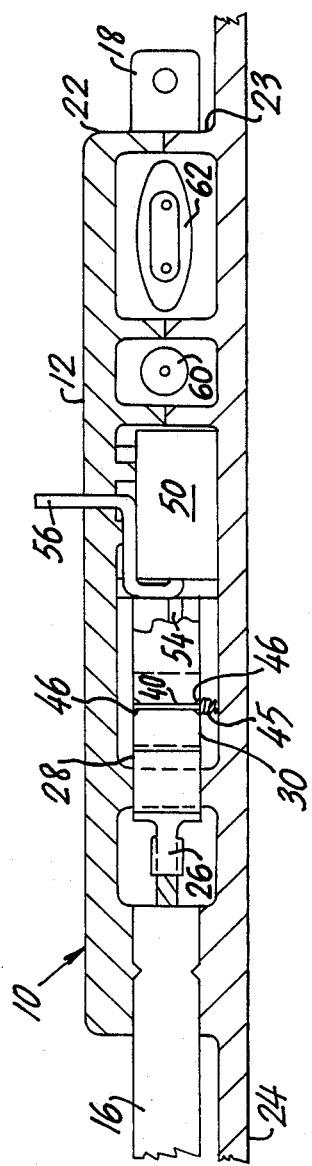

SHOCK HAZARD PROTECTOR FOR HAIR DRYERS

BACKGROUND OF THE INVENTION

1. Field of the Invention

This invention relates to electrical safety provisions in small appliances. More particularly, the invention relates to apparatus for sensing water in hair dryers and for opening both power lines substantially simultaneously.

2. Description of the Prior Art

Hand held hair dryers and similar small electrical appliances are often used in environments creating some risk that the appliances will come into contact with water, thereby creating the danger of electrocution or serious shock to the user. These dangers exist whether or not the power switch of the appliance is on or off because of the presence of electrical potential on conductive parts within the appliance. The use of a double-throw waterproof switch eliminates these dangers when the appliance is turned off, but serves no salutary purpose when power is on.

Ground fault circuit interrupters are often used as safety circuits to limit the danger of a user suffering electrocution or serious shock which may be caused by touching an appliance having an electrical potential. These devices open the power line upon the occurrence of a flow of electrical current to ground through other than the normal return path of the circuit in which the appliance is connected. Since ground fault circuit interrupters require a differential of current flow they are not totally effective shock hazard protectors because there may be situations where a danger of electrocution exists with no such differential. Furthermore, ground fault circuit interrupters are generally large and costly and, therefore, difficult to install into small appliances. Their ability to be reset also makes them unsuitable for small appliances since the user may reset them prematurely. Often they are installed in the walls of newly constructed dwellings so as to automatically protect the user when an appliance is plugged in. However, for older residences there is no such safety feature unless it is installed in or retrofit into the small appliance.

It is also known in the prior art to provide ground fault circuit interrupters for interrupting both the hot and neutral lines simultaneously whenever a fault is present, since it is not known which of the conductors is electrically connected to the hot side of the power line. However, such prior art devices as are capable of relatively quickly opening both lines simultaneously are costly so as to make their use in small appliances prohibitive. Less expensive prior art devices are relatively slow in opening both lines simultaneously and do not, therefore, provide a satisfactory safety feature.

Some prior art shock hazard protectors are known which shut power off when the appliance comes in contact with water. These devices generally have two main features; a sensor means to sense the danger causing condition and an actuator means to rapidly open the power lines. U.S. Pat. No. 4,464,582, for example, shows an automatic power shut off circuit which utilizes a pair of flexible metallic conductors spaced apart a predetermined distance and secured to an electrical appliance in a labyrinthine pattern. When water bridges the space, the circuit energizes a solenoid to open a pair of switches in the power lines to the appliance. Both the sensing and actuation portions of this device are too costly and complex to be incorporated in relatively low cost electrical appliances.

Another type of shock hazard protector is shown in German patent application No. 32 08 147 A1. The sensor part of the device shown in that application is a two-wire circuit arranged at the edges of openings and joints through which water can penetrate. The device also includes a triac having a firing circuit responsive to the sensor. The actuator part of the device is a self-opening mechanical switch which is normally held closed by a fusible wire which is melted upon the firing of the triac. The actuator part of this device is complex and appears relatively costly to assemble for use in a small appliance. The sensor part of this device requires several circuit components and must be triggered by a water bridge across the two-wire circuit. The sensor is, therefore, also relatively costly. The sensor circuit is also admittedly deficient since it is inoperative during the first 1.5 power line half cycles because of the need to charge a capacitor in the firing circuit. This delay plus the risk that some of the electrical components may fail, are unacceptable deficiencies. This German application shows an alternative embodiment which does not have the delay disadvantage but, since it includes several electrical components, there is still a risk of failure.

The complexity of the aforementioned patents results because the devices are intended to turn power off to the small appliance when water bridges a pair of sensor wires, before it touches any high voltage parts of the appliance. The sensor circuit must, therefore, necessarily have a high impedance to insulate the user from shock in the event he or she actually touches the sensor wires. The circuit must also be capable of determining when the wires are bridged and actuating the mechanism which actually opens the power lines. The complexity and high cost of these devices inhibits their use in small appliances.

Accordingly, there is a need for a safe shock hazard protector which is sufficiently inexpensive so it may be included in relatively low cost appliances such as hair dryers, curling irons and the like It is a further object to produce a low cost shock hazard protector capable of opening both sides of a two-line power source simultaneously.

It is yet another object to produce a hair dryer having a shock hazard protector which is non-resettable.

SUMMARY OF THE INVENTION

These and other objects are achieved by a shock hazard protector constructed according to the preferred embodiment of the invention which comprises an appliance and a circuit for use therein having a pair of opposedly biased electrical contacts each held in contact with a respective one of the two power lines supplying an electrical appliance by a fusible link. A triac is connected to conduct current through the link upon being triggered by a sensing circuit. The sensing circuit comprises a plurality of single lines, each extending from the triac gate to a different point within the appliance. The different points are chosen as those through which water will most likely first enter the appliance. The shock hazard protector is designed to blow the fusible link within 5 m sec which is in accordance with a new requirement of Underwriter's Laboratories calling for hair dryer to have current leakage of less than 5 mamps 25 msec after immersion into a tank of water.

BRIEF DESCRIPTION OF THE DRAWINGS

FIG. 1 shows a diagrammatic plan view, in cross-section, of a shock hazard protector constructed in accordance with the principles of the invention.

FIG. 2 shows an elevation view of the shock hazard protector shown in FIG. 1 taken along the line 2—2.

FIG. 3 is a diagrammatic view of the shock hazard protector of FIG. 1 installed in a hair dryer.

FIG. 4 is a view of FIG. 1 taken along the line 4—4 showing one embodiment of a fusible link.

DESCRIPTION OF THE PREFERRED EMBODIMENT

Referring now to FIG. 1, there is shown a diagrammatic plan view of the shock hazard protector 10 constructed in accordance with the principles of this invention. Shock hazard protector 10 has a housing 12 molded about input power lines 14 and 16 from a power source such as a wall outlet providing 60 Hz, 110 volts. Housing 12 also receives output power leads 18 and 20 going to the electrical operating parts of an appliance such as hair dryer 21, best seen in FIG. 3. It will be understood that housing 12 may be mounted at any point along the power cord from the wall outlet to the appliance such as, for example, in the power plug, in a separate block intermediate the power plug and the appliance or in the handle of the appliance itself as shown in FIG. 3. Housing 12 must be waterproof if mounted in the handle and may be molded in two halves 22 and 23 of a suitable insulating plastic with appropriate guiding channels for receiving and retaining the input and the output power lines and other components. Bottom half 23 may be molded as part of the dryer handle 24.

The center conductors of each of the power lines 14 and 16 are connected via crimping connections 25 and 26, respectively, to flat conducting arms 27 and 28. Each of the output power leads 18 and 20 is biased inwardly at ends 29 and 30 in order to be placed and held in electrical contact with respective arms 27 and 28. Each of the ends 29 and 30 is bent into a hook 31 and 32, respectively, in order to facilitate inward biasing of ends 29 and 30 in order to maintain electrical contact between them and respective contact arms 27 and 28. Each of the lines 14, 16, 18 and 20 are crimped in their respective channels as shown at points 33 to enhance their security in housing 12.

The inward biasing of ends 29 and 30 is achieved by a fusible wire link 40 which is mechanically and electrically connected to hook portion 32. The mechanical connection of fusible link 40 to hook portion 31 is achieved via insulator 42 and an intermediate conducting plate 44. Fusible link 40 is in electrical contact with plate 44 which is in turn securely mechanically connected to, but electrically insulated from, hook portion 31. It will thus be noted that, in normal operation, each power line 14 and 16 has a contiguous uninterrupted electrical path through shock hazard protector 10.

As best seen in FIG. 4, fusible link 40 may, in the preferred embodiment, be in the form of a loop, the ends of which are twisted together at 45. To secure link 40, it is received in notches 46 of conductors 20 and 44.

The sensor portion of shock hazard protector 10 is best seen by reference to FIGS. 1–3. The sensor portion includes a normally open triac 50 which is mounted within waterproof housing 12. The output pins 52 and 54 of triac 50 are connected to current carrying leads 18 and intermediate plate 44, respectively. The wires connecting pins 52 and 54 to lead 18 and the intermediate conductor are flexible to prevent any connections to the triac from impeding motion of connectors when the fusible link is blown. The gate pin 56 of triac 50 is led out of housing 12 to be connected to a plurality of sensor wires 57, 58 and 59 best seen in FIG. 3.

Each of the sensor wires 57, 58 and 59 (which may be insulated except for the ends) has one of its ends connected to gate pin 56 and the other end secured within hair dryer 21 at any one of several different points. For example, sensor wire 59 may be situated adjacent the power switch (not shown) of the hair dryer, sensor wire 58 may be connected directly to the electrically conductive inlet air grill and sensor wire 57 may be directly connected to the electrically conductive nozzle grill. If these grills are plastic, a separate wire or metal foil may be secured adjacent the grills. Additional sensor wires may be secured within the hair dryer at locations such as seams between molded parts and other openings where water is most likely to enter. Upon the presence of water within the hair dryer sufficient to create a bridge between any live parts inside the dryer and any of the sensor wires, gate 56 will conduct and trigger triac 50 in order to close the circuit between pins 52 and 54. This will cause a high current to pass through fusible link 40 thereby melting it and allowing leds 18 and 20 to spring away from their respective contacts 27 and 28 to open both power lines simultaneously.

The resistor 60 and capacitor 62 are mounted in housing 12 and electrically connected in series between the power lines and in parallel with the fusible link and the triac to prevent premature triggering of the triac by inductive surges.

It will be understood by those skilled in the art that numerous modifications and improvements may be made to the preferred embodiment of the invention disclosed herein without departing from the spirit and scope thereof.

What is claimed is:

1. An apparatus which opens two AC power lines simultaneously, said power lines comprising part of a two-line AC power circuit providing electrical power to an appliance, said apparatus comprising:

a first substantially parallel pair of spaced electrically conductive contacts, each having a proximate fixed end for being placed into electrical contact with a respective one of said two power lines and a distal end;

a second pair of resilient elongated, electrically conductive contacts, each connected at one end to the electrical operating components of said appliance and each having a first end opposite said one end and adjacent said distal ends of said first pair of contacts, said first ends being normally biased away from each other and movable in the plane defined by said distal ends and spaced from each other outwardly of said distal ends;

an insulator secured adjacent said first end of one of said second pair of contacts;

an intermediate conductor secured to said insulator;

a single electrically conductive biasing fusible means connected to said intermediate conductor and to the other of said second pair of contacts for biasing both of said second pair of contacts toward each other to cause each of said first ends of said second pair of contacts to be in electrical contact with a respective one of said distal ends of said first pair of contacts, said fusible means normally not conducting current therethrough;

at least one sensor operatively associated with said appliance for sensing the presence of water within said appliance and for providing an indication thereof;

a triac having two output pins and a gate input pin, the gate input pin of said triac electrically connected to at least one of said sensors, one output pin of said triac electrically connected to said intermediate conductor, the other output pin of said triac electrically connected to one of said power lines, said triac causing, upon the occurrence of said indication from at least one of said sensors, current to be conducted through said fusible means to melt same.

2. An apparatus according to claim 1 wherein said fusible means is a wire loop.

3. An apparatus according to claim 1 wherein the electrical connection between said intermediate conductor and said other output pin of said triac is flexible.

4. In an apparatus which interrupts a two line power circuit wherein each of said lines includes, intermediate the ends of said lines, a pair of electrical contacts, one contact of each pair being relatively stationary and the other contact of each pair being flexible, the improvement comprising:

means for mounting both of said flexible contacts so they are each independently movable within a common plane about a fixed point of attachment;

means for mechanically retaining each of said flexible contacts in contiguity with its respective stationary contact by a single, common fusible means attached to both of said flexible contacts, said fusible means supplying to said flexible contacts mutually opposing forces whereby each flexible contact serves as a means for holding the other in contiguity with its respective stationary contact.

* * * * *